United States Patent [19]

Schmidt et al.

[11] Patent Number: 4,959,419
[45] Date of Patent: Sep. 25, 1990

[54] POLYMERIC EMULSIFIERS BASED ON AMINOTELECHELIC OLIGOMERS I

[75] Inventors: Adolf Schmidt, Cologne; Udo W. Hendricks, Odenthal; Bruno Bömer, Bergisch Gladbach; Karl H. Ott, Leverkusen; Herbert Eichenauer, Dormagen; Alfred Pischtschan, Kürten-Eichhof, all of Fed. Rep. of Germany

[73] Assignee: Bayer Aktiengesellschaft, Leverkusen, Fed. Rep. of Germany

[21] Appl. No.: 133,517

[22] Filed: Dec. 16, 1987

[30] Foreign Application Priority Data

Dec. 20, 1986 [DE] Fed. Rep. of Germany ....... 3643792

[51] Int. Cl.$^5$ .............................. C08F 8/46; C08F 8/42
[52] U.S. Cl. ..................................... 525/301; 525/285;
525/327.8; 525/329.2; 525/329.3; 525/329.9;
525/330.2; 525/330.3; 525/330.6; 525/331.5;
525/333.1; 525/333.2; 525/366; 525/369;
525/370; 525/371; 525/378; 562/440; 562/560
[58] Field of Search ................. 525/333.1, 333.2, 285,
525/301, 327.8, 329.2, 329.3, 329.9, 330.2,
330.3, 330.6, 331.5; 562/440, 560

[56] References Cited

U.S. PATENT DOCUMENTS 2,647,146  7/1953  Arthur, Jr. .......................... 260/583
3,305,523  2/1967  Burnside .
3,853,815  12/1974 Lubowitz ............................ 260/835
4,304,882  12/1981 D'Angelo et al. ................ 525/333.2

FOREIGN PATENT DOCUMENTS 1495086  8/1967  France .

Primary Examiner—Bernard Lipman
Attorney, Agent, or Firm—Connolly and Hutz

[57] ABSTRACT

Polycarboxylic acids and their salts corresponding to the following general formula $$[X]-(NHOC-Y-COO\ M)_n \qquad (I)$$

in which
X is the residue of a hydrophobic, linear or branched vinyl oligomer having an average molecular weight $\overline{M}_n$ of from 200 to 5000 and preferably from 300 to 3000,
Y is the 1,2-vinylene, 1,2-ethylene, 1,3-propylene, 1,2-phenylene, 1,2-cyclohexen-4-ylene or 1,2-cyclohexylene group,
n is a number of from 1.4 to 3.0 and preferably from 1.6 to 2.3 and
M is hydrogen, an alkali metal, an ammonium, $C_1$-$C_4$ alkylammonium or $C_2$-$C_3$ hydroxyalkylammonium group, which are useful as surfactants and emulsifiers in aqueous systems.

3 Claims, No Drawings

POLYMERIC EMULSIFIERS BASED ON AMINOTELECHELIC OLIGOMERS I

This invention relates to polycarboxylic acids and salts of polycarboxylic acids corresponding to the following general formula

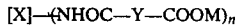

in which
- X is the residue of a hydrophobic, linear or branched vinyl oligomer having an average molecular weight $\overline{M}_n$ of from 200 to 5000 and preferably from 300 to 3000,
- Y is the 1,2-vinylene, 1,2-ethylene, 1,3-propylene, 1,2-phenylene, 1,2-cyclohexen-4-ylene or 1,2-cyclohexylene group,
- n is a number of from 1.4 to 3.0 and preferably from 1.6 to 2.3 and
- M is hydrogen, an alkali metal, an ammonium, $C_1$–$C_4$ alkylammonium or $C_2$–$C_3$ hydroxyalkylammonium group.

The present invention also relates to the application of the compounds corresponding to formula I as surfactants and emulsifiers in aqueous systems.

Examples of the vinyl oligomers on which X is based are oligobutadienes and oligoisoprenes and also the corresponding products with partly or completely hydrogenated double bonds, oligomers of ethylene, propene, styrene, vinyl esters containing from 2 to 4 carbon atoms in the carboxylic acid part, (cyclo)aliphatic esters of (meth)acrylic acid containing from 1 to 12 carbon atoms in the alcohol component, triethoxyvinyl silane or trimethyl vinyl silane.

Examples of M are sodium, potassium, ammonium, mono-, di- or trimethylammonium, mono-, di- or tri-(hydroxyethyl)ammonium or mono- or di-(hydroxypropyl)-ammonium.

The present invention also relates to the use of the polymeric emulsifiers for the production of emulsion polymers, more especially graft bases for improved high-impact thermoplasts.

The compounds corresponding to formula I are produced in known manner by reacting amino-terminated vinyl oligomers corresponding to the following formula

in which
X and n are as defined above, with dicarboxylic acid anhydrides corresponding to the following formula

in which Y is as defined above, at temperatures of from 20° to 120° C. and preferably at temperatures of from 40° to 70° C. and optionally in the presence of inert solvents in a molar ratio of at least 1:n, after which the reaction products obtained are optionally neutralized with alkali hydroxides, ammonia, $C_1$–$C_4$ alkylamines or $C_2$–$C_3$ hydroxyalkylamines.

The amino-terminated vinyl oligomers corresponding to formula II, which are referred to hereinafter as aminotelechelic vinyl oligomers, are known.

Suitable aminotelechelic oligomers are, for example, the products described in DOS No. 2 151 848, providing they are insoluble in water, and also aminotelechelic oligopropylenes, oligobutadienes, oligoisoprenes and aminotelechelic oligobutadienes and oligoisoprenes of which the double bonds have been complete or partly hydrogenated.

The production of aminotelechelic vinyl oligomers such as these is known and comprises polymerizing vinyl monomers using large quantities of nitrile-containing aliphatic azoinitiators to form nitrile-terminated vinyl oligomers which are converted into the aminotelechelic vinyl oligomers of formula II by catalytic hydrogenation of the terminal nitrile groups to primary amino groups.

U.S. Pat. No. 2,561,068 for example describes inter alia the production of low molecular weight polybutadienes, polyisoprenes and polypropylenes containing approximately two terminal nitrile groups by batch polymerization of the corresponding monomers using large quantities of nitrile-containing aliphatic azo-initiators.

The catalytic hydrogenation of the terminal nitrile groups of products such as these to primary terminal amino-groups is described in U.S. Pat. No. 2,647,146. The wax-like consistency of the diamine prepared in Example 2 of this patent suggests at least partial hydrogenation of the double bonds of the oligobutadiene.

The nitrilotelechelic oligobutadienes of oligoisoprenes are preferably produced continuously in a flooded stirrer-equipped autoclave under pressures below 25 bar. The molecular weight of the oligomers may be regulated through the ratio of azodinitrile initiator to monomer. Suitable azodinitrile initiators are, for example, 2,2'-azobisisobutyonitrile (AIBN), 2,2'-azobis-2-methylbutyronitrile, 1,1'-azodicyclopentanecarbonitrile, 1,1-azodicyclohexanecarbonitrile, 2,2'-azobiscyclopentylpropionitrile, 1,1'-azodicamphorcarbonitrile, 2,2'-azobis-($\beta,\gamma$-dimethylvaleronitrile), 2,2'-azobis-2-phenylpropionitrile, 2,2'-azobis-2-benzylpropionitrile and 2,2'-azobis-2-(4-methoxyphenyl)-propionitrile.

Preferred initiators are AIBN, 2,2'-azobismethylbutyronitrile and 2,2'-azobis-($\alpha,\gamma$-dimethylvaleronitrile).

Where AIBN is used as initiator, the preferred polymerization temperatures are in the range from 90° to 130° C. while the average residence times are from 1 to 6 hours.

Suitable nitrilotelechelic oligobutadienes and oligoisoprenes may of course also be produced by a feed process.

The terminal nitrile groups are hydrogenated in known manner by catalytic hydrogenation of the oligomer dissolved in a solvent, such as toluene for example. Raney cobalt for example is suitable for the selective hydrogenation of the nitrile groups; the formation of secondary and tertiary amino groups may be suppressed by an addition of $NH_3$.

The $H_2$ pressure is preferably from 100 to 200 bar while the hydrogenation temperature is in the range from 100° to 200° C. With very long hydrogenation times or where Raney nickel is added to the Raney cobalt, it is also possible to hydrogenate the C—C—double bonds of the oligobutadienes or oligoisoprenes.

The production of aminotelechelic oligostyrenes, aminotelechelic oligoethylenes, aminotelechelic oligoacrylic acid ethyl ester, aminotelechelic oligomethacrylic acid methyl ester and aminotelechelic oligovinyl acetate is described in the Examples of DOS No. 2 151 848. The nitrilotelechelic starting products are produced by the process according to DOS No. 2 030 589. In addition, the production of dinitrilotelechelic oligostyrenes was described in detail by Konter, Bömer, Köhler and Heitz in Makromol, Chem. 182 (1981) 2619–2632. Suitable dicarboxylic acid anhydrides corresponding to formula III are, for example, succinic acid, glutaric acid, maleic acid and phthalic acid anhydride and also tetra- and hexahydrophthalic acid anhydride.

Suitable solvents for the reaction of the aminotelechelic vinyl oligomers of formula II with the dicarboxylic acid anhydrides of formula III are, for example, aliphatic or aromatic hydrocarbons, more especially toluene and xylene, aliphatic or aromatic halogenated hydrocarbons, such as for example methylene chloride, ethylene chloride or chlorobenzene, esters or ketones, such as for example ethyl acetate or acetone.

The aminotelechelic vinyl oligomers are preferably dissolved in the solvent and the dicarboxylic acid anhydrides added to the resulting solutions at the selected reaction temperature. The quantitative ratio between the components is selected so that, for every amine equivalent of the aminotelechelic vinyl oligomers, there is at least one equivalent of the dicarboxylic acid anhydrides; the dicarboxylic acid anhydrides may be used in a slight excess.

The reaction products are then neutralized, optionally after removal of the solvents by distillation, by addition of alkali hydroxides, ammonia, $C_1$–$C_4$ alkylamines or $C_2$–$C_3$ hydroxyalkylamines, preferably in the form of aqueous or alcoholic solutions.

The polymeric emulsifiers are used in quantities of from 0.2 to 20% by weight and preferably in quantities of from 1 to 10% by weight, based on the quantity of monomer.

They are suitable, for example, for the emulsion polymerization of butadiene, isoprene, chloroprene, styrene and styrenes substituted in the aromatic nucleus, α-methyl styrene, (meth)acrylic acid esters containing from 1 to 20 carbon atoms in the alcohol component, vinyl esters containing from 2 to 10 carbon atoms in the carboxylic acid component, ethylene, vinyl chloride, vinylidene chloride, acrylonitrile and methacrylonitrile and combinations of these monomers suitable for emulsion copolymerization. In addition, small quantities (approx. 0.1 to 10% by weight) of (meth)acrylic acid, (meth)acrylamide, maleic acid, itaconic acid, vinyl sulfonic acid, methallylsulfonic acid, vinyl phosphonic acid or acrylamido-2-methylpropanesulfonic acid (AMPS) may also be incorporated in order additionally to stabilize the emulsions. The polymeric emulsifiers according to the invention are preferably used for the polymerization of butadiene, isoprene and chloroprene and also for the copolymerization of butadiene-styrene, butadiene-acrylonitrile, ethylene-vinyl acetate, ethylene-vinyl chloride, styrene, butyl acrylate and styrene-acrylonitrile.

For the production of polybutadiene latices which are particularly suitable as graft bases for the production of high-impact thermoplasts of the ABS type, it is (particularly) preferred to use those polymeric emulsifiers of which the residue X consists of polybutadiene, polyisoprene or polyisoprene or polybutadiene of which the double bonds are completely or partly hydrogenated.

PRODUCTION EXAMPLES 1–4

Polymerization of butadiene or isoprene

A 6-liter stirrer-equipped autoclave with a pressure-retaining valve is completely filled with toluene and heated to an internal temperature of 120° C. The quantities indicated in the table of liquid butadiene or isoprene and of a toluene solution containing 40 g azoisobutyronitrile (AIBN) per liter are pumped in hourly at the temperature of 120° C.

The pressure-retaining valve is set at 16–18 bar. After a warm-up phase of 8 hours, the solution issuing from the autoclave is freed from residual monomer and concentrated by evaporation in vacuo.

| Production Example no. | 1 | 2 | 3 | 4 |
| --- | --- | --- | --- | --- |
| Butadiene [ml/h] | 750 | 1500 | — | — |
| Isoprene [ml/h] | — | — | 750 | 1500 |
| AIBN solution [ml/h] | 2250 | 1500 | 2250 | 1500 |
| Yield [g/h] | 360 | 580 | 385 | 630 |
| Nitrogen content [%] | 4.0 | 1.6 | 3.9 | 1.6 |
| $\overline{M}_n$ from N | 700 | 1750 | 720 | 1750 |
| $\overline{M}_n$ by vapor pressure osmosis | 730 | 1680 | 750 | 1790 |

PRODUCTION EXAMPLES 5–8

Production of the aminotelechelic oligomers by hydrogenation of the terminal nitrile groups 750 g nitrilotelechelic oligomer, 2 l toluene, 375 ml liquid ammonia and 75 g Raney cobalt are introduced into a 4-liter autoclave and hydrogenated for 10 hours at 200° C. under a hydrogen pressure of 100 bar.

After the catalyst has been filtered off, the toluene is removed in vacuo.

| Production Example no. | 5 | 6 | 7 | 8 |
| --- | --- | --- | --- | --- |
| Oligobutadiene from Example no. | 1 | 2 | — | — |
| Oligoisoprene from Example no. | — | — | 3 | 4 |
| Yield [g] | 740 | 730 | 755 | 725 |
| Total nitrogen [%] | 3.9 | 1.5 | 3.7 | 1.55 |
| Base nitrogen [%] | 3.2 | 1.49 | 3.5 | 1.55 |
| Primary nitrogen [%] | 2.9 | 1.45 | 3.3 | 1.45 |
| Secondary nitrogen [%] | 0.2 | 0.03 | 0.15 | 0.08 |
| Tertiary nitrogen [%] | 0.1 | 0.01 | 0.05 | 0.02 |
| $\overline{M}_n$ from total N | 740 | 1870 | 760 | 1800 |

EXAMPLE 9

120 parts of an aminotelechelic oligobutadiene prepared in accordance with Example 5 (base nitrogen 3.2%, $\overline{M}_n$ 740) were dissolved in 50 parts toluene, 29 parts maleic acid anhydride were added in portions to the resulting solution at 50° to 60° C. and the whole stirred for 1 hour at 60° to 70° C. Removal of the toluene by distillation in vacuo left 148 parts of a viscous, dark-brown residue which had an acid number of 114 mg KOH/g. The IR spectrum showed the presence of an acid amide group.

The residue was dissolved in 120 parts ethanol and neutralized at 40° to 50° C. with 60 parts of a 20% sodium hydroxide solution. Ethanol and water were largely distilled off in vacuo and the residue was dissolved in water with addition of 10 parts sodium chloride. A viscous, clear solution of the sodium salt, solids content 44%, was obtained.

EXAMPLE 10

120 parts of an aminotelechelic oligoisoprene prepared in accordance with Example 7 (base nitrogen 3.5%, $\overline{M}_n$760) were reacted with 39 parts maleic acid anhydride in the same way as described in Example 9. The acid number of the reaction product after concentration by evaporation was 115 mg KOH/g. A viscous, clear solution of the sodium salt, solids content 43%, was obtained after neutralization with 62 parts 20% sodium hydroxide solution in the same way as described in Example 9.

EXAMPLE 11

120 parts of an aminotelechelic oligoisoprene prepared in accordance with Example 8 (base nitrogen 1.55%, $\overline{M}_n$1800) were reacted with 14 parts maleic acid anhydride in toluene in the same way as described in Example 9. The acid number of the reaction product after concentration by evaporation was 59.2 mg KOH/g. A viscous solution having a solids content of 42.5%, which formed emulsions in water, was obtained after neutralization with 28 parts 20% sodium hydroxide solution in the same way as described in Example 9.

EXAMPLE 12

120 parts of an aminotelechelic oligobutadiene prepared in accordance with Example 6 (base nitrogen 1.49%, $\overline{M}_n$1870) were reacted with 14 parts maleic acid anhydride in toluene in the same way as described in Example 9. The acid number of the reaction product after concentration by evaporation was 59.7 mg KOH/g. A viscous solution having a solids content of 43.6%, which formed emulsions in water, was obtained after neutralization with 28 parts 20% sodium hydroxide solution in the same way as described in Example 9.

EXAMPLE 13

120 parts of an aminotelechelic oligoisoprene prepared in accordance with Example 7 (base nitrogen 3.5%, $\overline{M}_n$760) were dissolved in 80 parts toluene, followed by the addition in portions at 60° to 70° C. of 45.9 parts phthalic acid anhydride. After stirring for 2 hours at 60° to 70° C., the product is concentrated by evaporation in vacuo at 50° to 60° C. The evaporation residue has an acid number of 100.2 mg KOH/g. The IR spectrum shows the presence of a carbonamide group.

130 parts water and 68 parts 20% sodium hydroxide solution are added to the residue at 50° to 60° C., followed by stirring for 1 hour. A highly viscous, clear solution is obtained; it has a solids content of 47% and forms clear, intensively foaming solutions in water.

EXAMPLE 14

120 parts of an aminotelechelic oligobutadiene prepared in accordance with Example 6 (base nitrogen 1.49%, $\overline{M}_n$1870) are reacted with 19.2 parts phthalic acid anhydride in 80 parts toluene in the same way as described in Example 13. The evaporation residue had an acid number of 53.4 mg KOH/g. It was dissolved in 200 parts water and 26.5 parts 20% sodium hydroxide solution at 50° to 60° C. A whitish paste was obtained which had a solids content of 38.5% and which formed an emulsion in water.

EXAMPLE 15

120 parts of an aminotelechelic oligobutadiene prepared in accordance with Example 5 (base nitrogen 3.2%, $\overline{M}_n$740) were dissolved in 80 parts tetrahydrofuran and 46 parts hexahydrophthalic acid anhydride added to the resulting solution at 40° to 50° C. After stirring for 3 hours at 60° to 70° C., the solvent was removed in vacuo at 60° to 70° C. The acid number of the evaporation residue was 108.5 mg KOH/g. 130 parts water and 64 parts 20% sodium hydroxide solution were added to the residue, followed by stirring for 1 hour at 50° to 60° C. A viscous, clear solution having a solids content of 47% was obtained.

EXAMPLES 16–22

General polymerization procedure

The following components were introduced in the absence of oxygen into a 6-liter autoclave equipped with a flat blade agitator (150 r.p.m.) and an external jacket heating system with regulated internal temperature:

| | |
|---|---|
| Deionized water | 1850 g |
| Polymer emulsifier, 10% aqueous solution | 640 g |
| Tert.-dodecyl mercaptan | 5 g |
| 4,4'-azobis-(4-cyanopentanoic acid), potassium salt | 5 g |
| Dissolved in deionized water | 80 g |
| Butadiene | 1600 g |

The contents of the autoclave are heated to an internal temperature of 65° C. and kept constant at that temperature until the pressure has fallen from around 7 bar to around 1.5 bar. The autoclave is slowly vented, the butadiene escaping is removed and the latex is drained off and then freed from monomer by distilling off approx. 10% of the water in the latex and making up with fresh water.

| Example no. | Emulsifier of Example no. | Solids [% by weight] | Precipitate [g] | Particle size[a] [nm] | pH | Flow-out time[b] [sec.] | Electrical conductivity [ms] |
|---|---|---|---|---|---|---|---|
| 16 | 9 | 41 | 0 | 75 | 8.5 | 300 cp[c] | 2.0 |
| 17 | 10 | 38.5 | 8 | 65 | 10.9 | 32.3 | 2.4 |
| 18 | 11 | 42 | 6 | 300 | 10.3 | 16.9 | 1.4 |
| 19 | 12 | 39 | 12 | 350 | 12.3 | 16.5 | 4.3 |
| 20 | 13 | 35 | 0 | 70 | 11.1 | 26.3 | 1.9 |
| 21 | 14 | 37 | 10 | ~300 | 10 | 16 | — |
| 22 | 15 | 36 | 75 | 95 | 6.6 | 18.7 | 2.1 |

[a]As determined by turbidity measurement (corresponds to $D_{.1F}$; see DIN 53 206)
[b]Orifice cup according to DIN 53 211. 4 mm orifice, 25° C.
[c]Brookfield viscosimeter (spindle 2; 6 r.p.m.)

We claim:

1. Polycarboxylic acid salts corresponding to the following general formula $$X\text{-}(NHCO\text{-}Y\text{-}COO^{\ominus})_n \, nM^{\oplus}$$

in which

X represents the residue of a hydrophobic, linear or branched vinyl oligomer having an average molecular weight $\overline{M}_n$ of from 200 to 5000, Y is the 1,2-vinylene, 1,2-ethylene, 1,3-propylene, 1,2-phenylene, 1,2-cyclohexene-4-ylene or 1,2-cyclohexylene group, n is a number of from 1.4 to 3.0, M represents an alkali metal, an ammonium, $C_1$–$C_4$ alkylammonium or $C_2$–$C_3$ hydroxyalkylammonium group.

2. Polycarboxylic acid salts according to claim 1 wherein X is the residue of an oligobutadiene or an oligoisoprene.

3. Polycarboxylic acid salts according to claim 1 wherein S is the residue of a hydrogenated oligobutadiene or oligoisoprene.

* * * * *